(12) United States Patent
Nguyen

(10) Patent No.: US 6,771,168 B1
(45) Date of Patent: Aug. 3, 2004

(54) AUTOMOTIVE SYSTEM TO PREVENT CAR JACKING

(76) Inventor: Hap Nguyen, 17461 Pleasant Ct., Fountain Valley, CA (US) 92708

( * ) Notice: Subject to any disclaimer, the term of this patent is extended or adjusted under 35 U.S.C. 154(b) by 1825 days.

(21) Appl. No.: 08/427,447

(22) Filed: Apr. 24, 1995

(51) Int. Cl.$^7$ .............................................. B60R 25/10
(52) U.S. Cl. ............................ 340/426.17; 340/825.31; 180/287; 307/10.2
(58) Field of Search ........................... 340/426.17, 428, 340/429, 430, 825.31, 825.72; 307/10.2, 10.3, 10.4, 10.5, 10.6; 180/287

(56) References Cited

U.S. PATENT DOCUMENTS

| | | | |
|---|---|---|---|
| 4,260,982 A | * 4/1981 | DeBenedictis et al. | ...... 340/426 |
| 5,105,190 A | * 4/1992 | Kip et al. | ................ 340/572.1 |
| 5,280,267 A | * 1/1994 | Reggiani | ................... 180/287 |
| 5,280,268 A | * 1/1994 | Matthews | ................... 340/426 |
| 5,349,329 A | * 9/1994 | Smith | ........................ 340/426 |
| 5,459,448 A | * 10/1995 | Dortenzio et al. | .......... 180/287 |
| 5,493,268 A | * 2/1996 | Lewis, Sr. et al. | .......... 340/426 |
| 5,583,486 A | * 12/1996 | Kersten | ...................... 340/426 |

FOREIGN PATENT DOCUMENTS

GB 2233487 * 1/1991 ................. 340/426

* cited by examiner

Primary Examiner—Daniel J. Wu
(74) Attorney, Agent, or Firm—John P. Halvonik

(57) ABSTRACT

The invention is a system for use in automobiles for preventing and frustrating carjacking attempts. The system includes a Radio Frequency Identification Tag (RFIT) kept by the user and an interrogating system on the car that periodically reads the RFIT in order to confirm that the driver does have permission of the owner to continue to drive the car. The system on the car includes a microprocessor driven transceiver controller printed circuit board. The circuit board is hard wired into a number of different control systems including the fuel delivery system, emergency lights and horn. In the event that the user has been forced out of the car, the RFIT will no longer be in proximity to the interrogating system and the proper code will no longer respond to the interrogating signal. The control system will then take steps to shut down the operation of the vehicle engine and send out audible and visual emergency signals.

2 Claims, 4 Drawing Sheets

AUTOMOTIVE SYSTEM TO PREVENT CAR JACKING

FIELD AND BACKGROUND OF THE INVENTION

The invention relates to the field of automobiles and in particular to an automobile system that interrogates a card kept by the user on a periodic basis in order to confirm that the driver has permission to continue to drive the car.

DESCRIPTION OF THE PRIOR ART

While there are input devices used on cars that require the user to input a code or other identifying means, these devices are not in use once the car has been started. The system described herein uses an inputted code in order to start the car but also continues to the interrogate the user (or more precisely, his ID card) on a periodic basis after the car has been started.

This in turn discourages carjackings because should the interrogating means fail to receive the correct ID in response to its signal, the controller will disable the car after a certain time period. The controller will fail to receive the correct ID signal when the user's ID card is no longer within a certain range of the car. The time period may be changed but should be long enough so that the carjacker will have traveled far enough so that the owner is a safe distance away from the carjacker and car.

SUMMARY OF THE INVENTION

The invention is a system for use in automobiles for preventing and frustrating carjacking attempts. The system includes a Radio Frequency Identification Tag (RFIT) kept by the user and an interrogating system on the car that periodically sends out interrogating signals. The RFIT responds to the signals by emitting an authorized code that confirms that the driver does have authorization to drive the car.

The system on the car includes a microprocessor driven transceiver controller printed circuit board. The circuit board is hard wired into a number of different control systems including the fuel delivery system, emergency lights; horn; invisible ink emitter, and homing devices. In the event that the user has been forced out of the car, the RFIT will no longer be in proximity to the interrogating system and the proper code will no longer respond to the interrogating signal. The control system will then take steps to shut down the operation of the vehicle engine and send out audible and visual emergency signals.

It is an object of the invention to provide a vehicle system that will prevent a vehicle from being operated in the event that an unauthorized person is operating the vehicle.

Another object of the invention is to provide a vehicle control system that periodically sends out interrogating signals that require an authorization signal in response in order to insure that an authorized person remains in the vehicle.

Another object of the invention is to provide a vehicle operating system that will shut down the operation of the vehicle in the event of unauthorized and will permit the vehicle to be driven for a short distance after the unauthorized use has begun for safety purposes.

Other objectives of the invention will become apparent to those skilled in the art once the invention has been shown and described.

DESCRIPTION OF THE PREFERRED EMBODIMENT

The controller 4 will be connected to the vehicle engine 6 and may be in proximity to the vehicle instrument panel. The controller should have a key pad and will require that the user input a certain prearranged code before starting the car. The controller will not permit the vehicle shown by dashed lines 10 to be started unless this code is inputted. In the event of a certain number of failures to input the correct code the vehicle will be disabled for a time.

Figure 1:
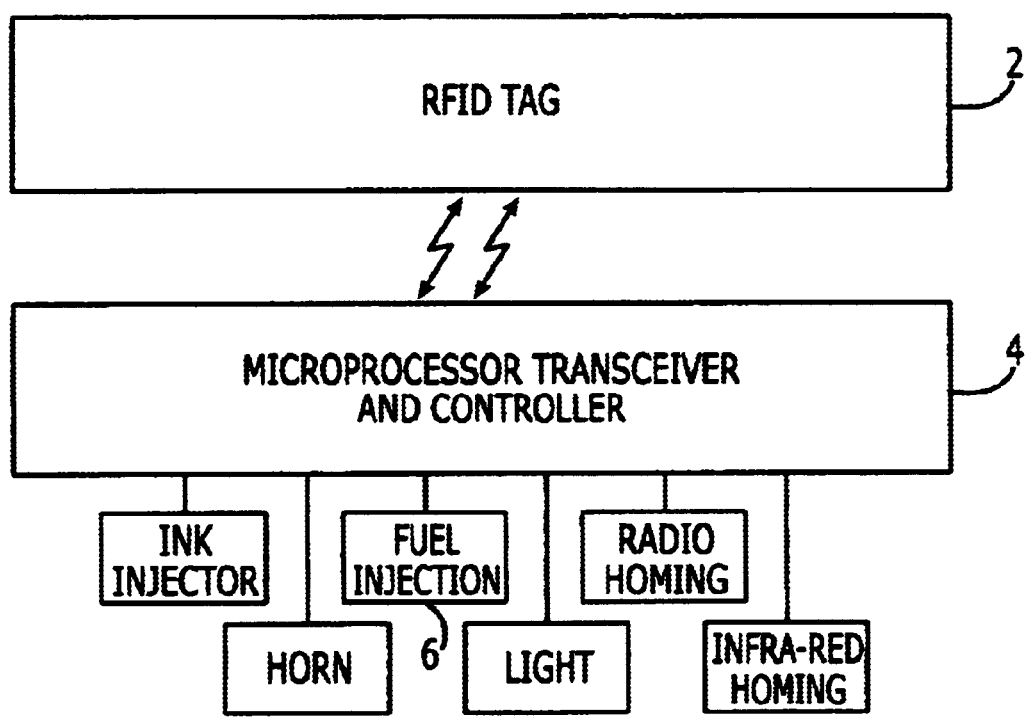
FIG. 1 Overall construction of RFID tag and controller.
Figure 2:
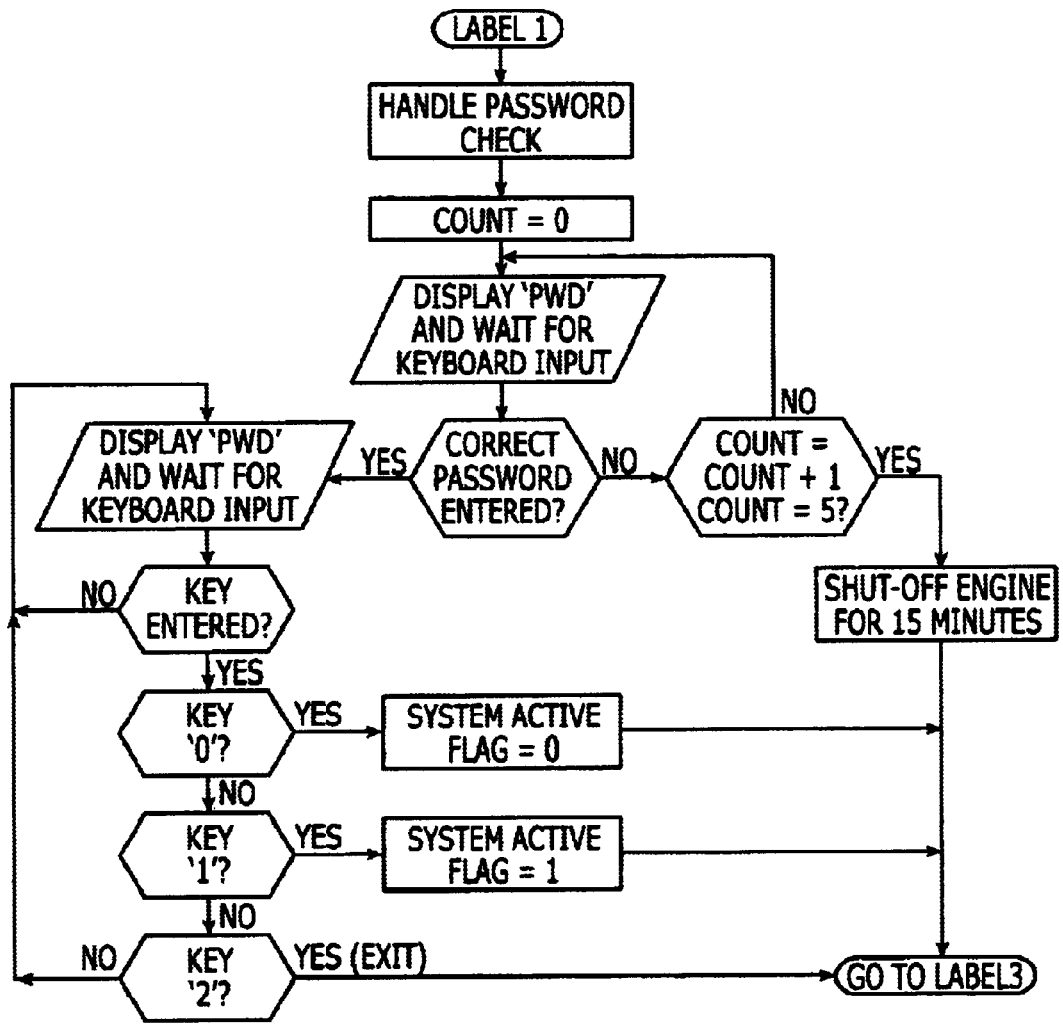
FIGS. 2–4 Flow chart showing operation of the program in the controller.
Figure 3:
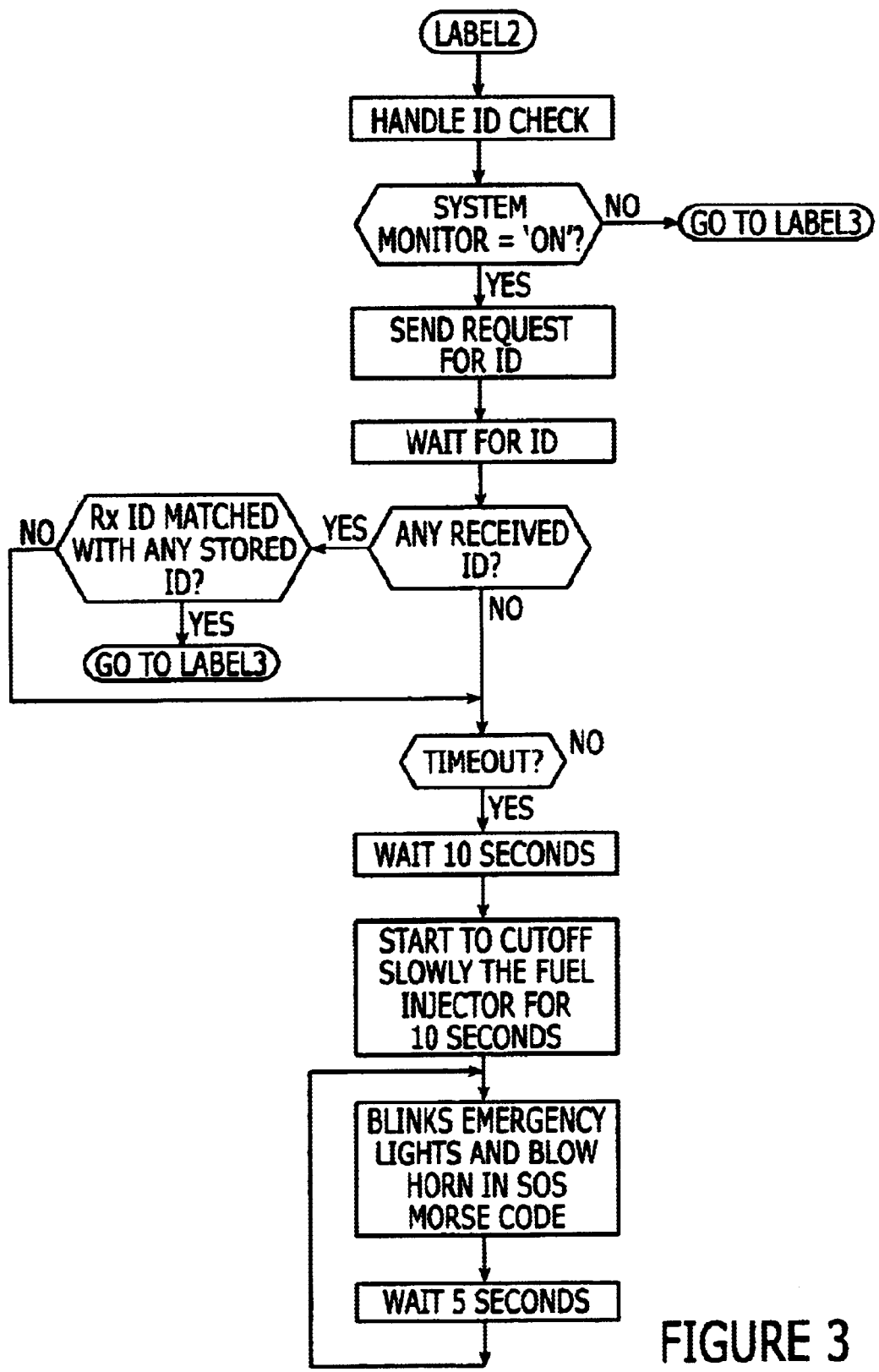
Figure 4:
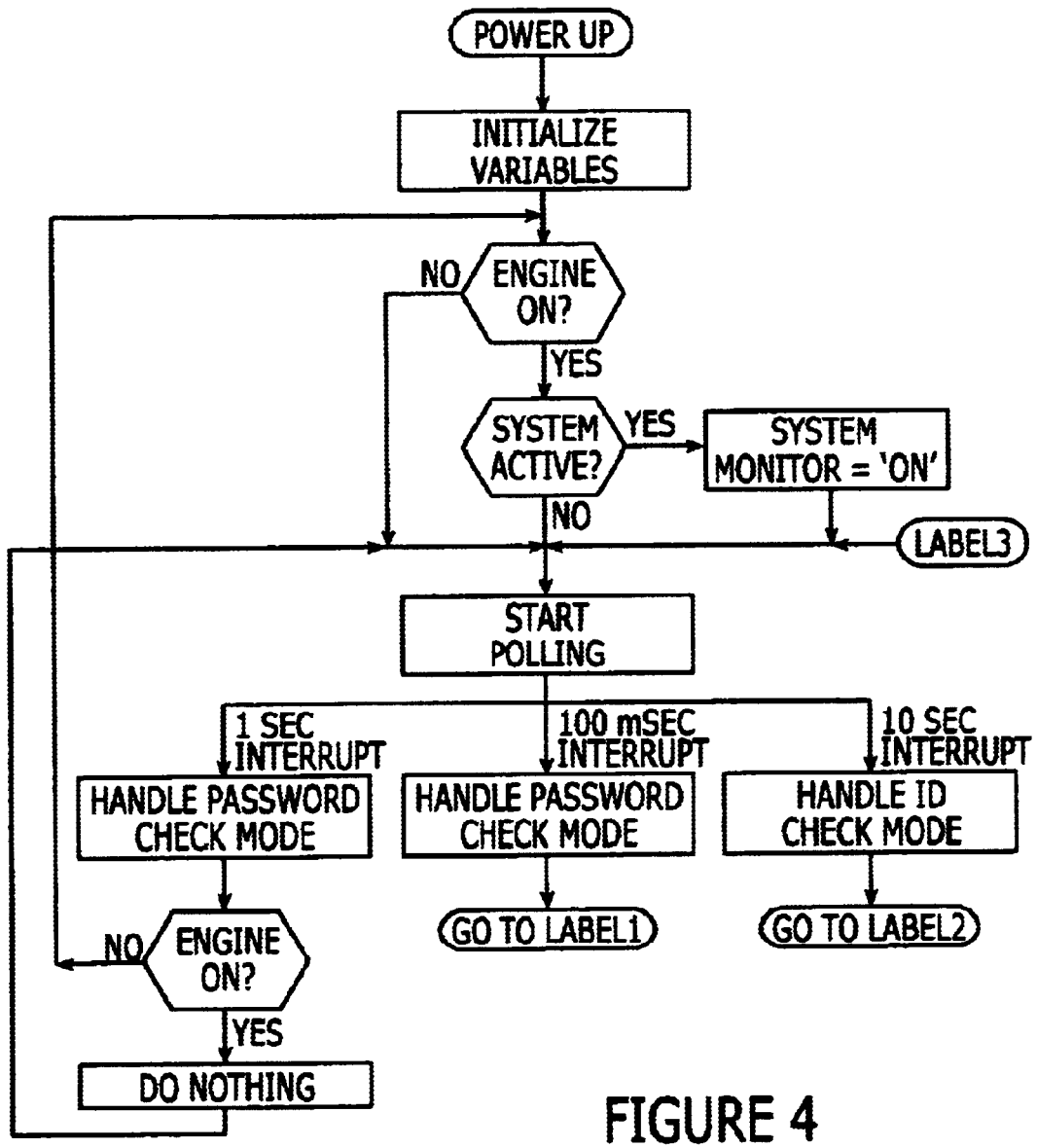

FIGS. 2–4 show a flow chart showing the operation of a computer program in the controller.

The controller should have a means whereby the ID codes of family members and other authorized personnel may be input into the controller on a one time basis so that it will be able to authorize use of the car in the event that one of these authorized personnel are using the vehicle.

The controller may be set up with a special password that needs to be inputted at the start before the vehicle can be operated. There may also be a special Valet Parking mode that can be set through use of the key pad so that the owner can allow unauthorized driver to drive the car for a short time in order to park the car.

The RFID tag 2 may be made of standard, off the shelf, components. This may be a relatively small device and should be kept on the person of the owner and any other authorized people who may drive the vehicle. The RFID tag will send out an authorization signal, in response to an interrogating signal, on a radio frequency for a short range, say 30 feet. The RFID tag may be powered by rectifying and storing RF energy that it receives. This may be stored in a capacitor and may obviate the need for a battery to power the RFID tag. The controller will periodically emit an interrogating signal, say every 10–30 seconds. A radio frequency request will be broadcast and the RFID will respond back with an authorized code in a radio frequency. The controller has a microprocessor in order to read the signal it has received and to determine whether this is an authorized code.

The controller will be hard wired into a number of different components in the vehicle so that these can be activated in the event of unauthorized use of the car. The controller may be hardwired to the fuel injection system or other system that controls the operation of the engine. It can be wired to the lights and or horn so that it can broadcast emergency signals in the event of non-authorized use. It may be connected to an invisible ink emitter that can mark the suspect in the driver's seat. It can also be wired into homing devices that may be used to locate the position of the vehicle in the event that it is stolen.

In the event of a carjack, the owner or other authorized personnel will be forced out of the vehicle. As the carjacker drives away nothing will happen at that moment since the RFID will be able to broadcast for say 30 feet so the controller will not determine there is a problem when the owner is still in proximity to the vehicle.

After the car is driven out of the range of the RFID the controller will continue to send out interrogating signals on a periodic basis. At say 30 seconds after the owner has left the vehicle, the controller will send out an interrogating signal and there will be no code signal in response. At this point, the fuel injector will cut down the fuel being sent to the engine on a gradual basis so that the vehicle will start to slow down.

The ignition will be cut off as well after a time so that the car cannot be started. Emergency lights and the horn will sound distress signals. Ink to identify the suspect may be sprayed onto the driver for later identification by police. Optional radio and infra red homing devices may be activate in order to locate the vehicle.

I claim:

1. A two part system for disabling the engine of a motor vehicle in the event of non-authorized use of said vehicle, said system comprising: a first part comprising: a controller in electrical connection with the engine of said vehicle and having a means to disable said engine, said controller having a means for propagating a radio frequency interrogating signal on a periodic basis and within a limited area; said area being defined in terms of the distance from said controller; a second part comprising: a radio frequency transmitting and receiving device for sending out a radio frequency response signal in response to said interrogating signal and of size suitable for concealment on a human; said controller having a means for receiving said response signal and for determining whether said response signal is an authorized signal, said controller having a means for disabling said engine in the event that said signal is not an authorized signal; wherein said limited area is defined by a distance from said controller and said distance about 30 feet.

2. The apparatus of claim 1 wherein said period is between about 10 and 30 seconds.

* * * * *